(12) United States Patent
Fukumori et al.

(10) Patent No.: US 10,295,019 B2
(45) Date of Patent: May 21, 2019

(54) BICYCLE CHAIN

(71) Applicant: Shimano Inc., Sakai-shi, Osaka (JP)

(72) Inventors: Tsuyoshi Fukumori, Sakai (JP);
Yusuke Nishimoto, Sakai (JP);
Atsuhiro Emura, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 103 days.

(21) Appl. No.: 14/263,941

(22) Filed: Apr. 28, 2014

(65) Prior Publication Data

US 2015/0308542 A1    Oct. 29, 2015

(51) Int. Cl.
*B62M 9/00*    (2006.01)
*F16G 13/06*    (2006.01)
*F16G 15/12*    (2006.01)

(52) U.S. Cl.
CPC ............... *F16G 15/12* (2013.01); *B62M 9/00* (2013.01); *F16G 13/06* (2013.01); *B62M 2009/005* (2013.01)

(58) Field of Classification Search
CPC .................................. F16G 13/06; F16G 15/12
See application file for complete search history.

(56) References Cited

U.S. PATENT DOCUMENTS

| | | | | |
|---|---|---|---|---|
| 439,466 A * | 10/1890 | Brampton | ............... | F16G 13/06 474/228 |
| 663,352 A * | 12/1900 | Morse | ..................... | F16G 13/06 474/229 |
| 953,428 A * | 3/1910 | Morse | ..................... | F16G 13/06 474/229 |
| 1,105,288 A * | 7/1914 | Morse | ..................... | F16G 13/06 474/229 |
| 1,126,254 A * | 1/1915 | Morse | ..................... | F16G 13/06 305/196 |
| 1,634,334 A * | 7/1927 | Morse | ..................... | F16G 13/06 474/229 |
| 2,440,818 A * | 5/1948 | Bourdeaux | ............... | F16G 5/18 474/206 |
| 5,267,909 A * | 12/1993 | Iacchetta | ................. | F16G 13/04 474/206 |
| 5,322,483 A * | 6/1994 | Wang | ..................... | F16G 13/06 474/206 |

(Continued)

FOREIGN PATENT DOCUMENTS

CN    101063477 A    10/2007
DE    19904952 A1    8/2000

(Continued)

*Primary Examiner* — Minh Truong
(74) *Attorney, Agent, or Firm* — Alleman Hall Creasman & Tuttle LLP

(57) ABSTRACT

An inner link plate for a bicycle chain is provided. The inner link plate may have a longitudinal centerline defining a longitudinal direction and comprising a first inner-link end portion including a first inner-link opening having a first inner-link center axis, a second inner-link end portion including a second inner-link opening having a second inner-link center axis parallel to the first inner-link center axis, and an inner-link intermediate portion interconnecting the first inner-link end portion and the second inner-link end portion. The first inner-link end portion may have an extended edge portion extending to be away from the second inner-link end portion in the longitudinal direction.

19 Claims, 9 Drawing Sheets

(56) References Cited

U.S. PATENT DOCUMENTS

| | | | | |
|---|---|---|---|---|
| 7,325,391 | B1* | 2/2008 | Oishi | F16G 13/06 474/206 |
| 7,837,584 | B2* | 11/2010 | Wu | F16G 13/06 474/218 |
| 7,946,941 | B2* | 5/2011 | Oishi | F16G 13/06 474/206 |
| 8,250,846 | B2* | 8/2012 | Soerensen | F16G 13/20 198/784 |
| 2005/0020394 | A1* | 1/2005 | Valle | B62M 9/00 474/155 |
| 2007/0249449 | A1* | 10/2007 | Wu | F16G 13/02 474/206 |
| 2010/0035714 | A1* | 2/2010 | Sandro | F16G 13/06 474/231 |

FOREIGN PATENT DOCUMENTS

| | | |
|---|---|---|
| DE | 10127139 A1 | 1/2003 |
| TW | 200833976 A | 8/2008 |

* cited by examiner

BICYCLE CHAIN

FIELD OF THE INVENTION

This disclosure generally relates to a bicycle chain. More specifically, the present invention relates to an inner link plate for the bicycle chain.

BACKGROUND

Bicycling is becoming an increasingly more popular form of recreation as well as a means of transportation. Moreover, bicycling has become a very popular competitive sport for both amateurs and professionals. Whether the bicycle is used for recreation, transportation, or competition, the bicycle industry is constantly improving the various components of the bicycle. One component that has been redesigned is the bicycle chain. Most bicycles have a drive train that uses a chain to transmit the pedaling action from the rider to the rear wheel. Bicycle chains have a plurality of inner links and a plurality of outer links that are interconnected in an alternating manner by a plurality of pins. Typically, each of the inner links includes a pair of parallel inner plates connected by a pair of parallel hollow cylinders or pins surrounded by cylindrical rollers. Each of the outer links includes a pair of parallel outer plates connected by the pins of the adjacent inner links.

Some bicycles are designed to be mountain bicycles (MTBs) which are suitable for traveling off-road. Some of MTBs only have a single front sprocket, and its gear ratio is only adjustable by the rear derailleur configured to move the chain between sprockets in the rear sprocket assembly. MTBs are frequently used in various terrains and often receive large impacts and vibrations which may cause the chain to fall off the front sprocket. Thus, MTBs experience higher stresses than other types of bicycles, such as road bicycles.

FIG. 1A schematically shows a plan view of a drive train 140 of a bicycle. A rear sprocket assembly 180 of the drive train 140 is arranged so that its intermediate-size sprocket substantially aligns with a front sprocket 160 in the longitudinal direction of the bicycle. A driving direction of a chain 120 is illustrated by an arrow DD. Thus, for example, when the chain 120 is engaged with the largest rear sprocket, a rear part of the chain 120 is largely pulled toward a frame of the bicycle, indicated via arrow F.

In such a case, as shown in an enlarged view of a part Q of FIG. 1, considering that the chain 120 is disengaged from one of the teeth 162 of a front sprocket 160 at one of inner link plate pairs, at a location DE, adjacent outer link plate pair to the inner link plate pair in the driving direction DD is axially inclined toward a frame of the bicycle, at a location LE. Thus, the sprocket tooth located within the outer link plate pair tends to contact an interior surface of the outer link plate. Since gaps between the outer link plates are wider in the axial direction compared to gaps between the inner link plate pairs, the sprocket teeth 162 have a wider range of relative movement within the gaps between the outer link plate pairs. This axial movement is the largest at the location LE, which may result in chain 120 undesirably falling off of the front sprocket 160, resulting in inconvenience to the rider.

SUMMARY

To address the above discussed issues an inner link plate for a bicycle chain is provided. According to a first aspect of the invention the inner link plate has a longitudinal centerline defining a longitudinal direction and comprising a first inner-link end portion including a first inner-link opening having a first inner-link center axis, a second inner-link end portion including a second inner-link opening having a second inner-link center axis parallel to the first inner-link center axis, and a first inner-link intermediate portion interconnecting the first inner-link end portion and the second inner-link end portion, wherein the first inner-link end portion has an extended edge portion extending to be away from the second inner-link end portion in the longitudinal direction.

One potential advantage of such a configuration is that the extended edge portion decreases the gap between an interior section of the chain and a sprocket tooth when a pair of outer link plates is mated with the sprocket tooth. Therefore, the axial movement of the chain about the sprocket tooth is reduced, thereby decreasing the likelihood of the chain disengaging from the sprocket. As a result, chain operation is improved.

In the first aspect, the inner link plate may configured to be connected to an outer link plate comprising a first outer-link end portion, a second outer-link end portion and an outer-link intermediate portion interconnecting the first outer-link end portion and the second outer-link end portion, and the extended edge portion has a side surface configured to contact a sprocket tooth of a bicycle sprocket at an area axially adjacent to the outer-link intermediate portion of the outer link plate while the bicycle chain engages with the bicycle sprocket. One potential advantage of such a configuration is that the spacing between an interior section of the chain and the sprocket tooth is substantially eliminated on one side of the tooth, further decreasing the likelihood of chain disengagement from the sprocket and improving chain operation.

In the first aspect, the first inner-link end portion, the second inner-link end portion and the first inner-link intermediate portion may define an inner-link outer peripheral edge which may comprise a first inner-link end edge extending about the first inner-link end portion, a second inner-link end edge extending about the second inner-link end portion, and a pair of first inner-link intermediate edges extending along the first inner-link intermediate portion between the first inner-link end edge and the second inner-link end edge. A first inner-link distance is defined from the first inner-link center axis to an edge of the extended edge portion in the first inner-link end edge, a second inner-link distance is defined from the first inner-link center axis to the first inner-link end edge in an area except the extended edge portion, and the first inner-link distance is larger than the second inner-link distance. This has the advantage of enabling the extended portion of the inner link plate to extend into a gap between the sprocket tooth and an interior portion of the chain to further reduce axial movement of the chain, thereby reducing the likelihood of chain disengagement from the sprocket during chain operation.

In the first aspect, the second inner-link end portion may have an additional extended edge portion extending to be away from the first inner-link end edge in the longitudinal direction, which has the advantage of decreasing the gap between an inner side of the chain at both a leading edge of the first sprocket tooth and a trailing edge of a second sprocket tooth during chain operation.

In the first aspect, the first inner-link end portion, the second inner-link end portion and the first inner-link intermediate portion may define an inner-link outer peripheral edge which may comprise a first inner-link end edge extending about the first inner-link end portion, a second inner-link end edge extending about the second inner-link end portion, and a pair of first inner-link intermediate edges extending along the first inner-link intermediate portion between the first inner-link end edge and the second inner-link end edge. A third inner-link distance may be defined from the second inner-link center axis to an edge of the additional extended edge portion in the second inner-link end edge, a fourth inner-link distance may be defined from the second inner-link center axis to the second inner-link end edge in an area other than the additional extended edge portion, and the third inner-link distance may be larger than the fourth inner-link distance. This has the advantage of further decreasing play between the sprocket tooth and the chain when a pair of outer links is mated with the sprocket tooth.

In the first aspect, the extended edge portion may be positioned outside a sprocket tooth of a bicycle sprocket in an axial direction with respect to the first inner-link center axis while the bicycle chain is equipped on a bicycle and engages with the sprocket tooth. This configuration has the advantage of enabling the extended portion of the inner link plate to axially limit movement between the chain and the sprocket tooth when a pair of outer links in the chain is mated with the sprocket tooth.

In the first aspect, the extended edge portion may extend from an upstream side toward the outer-link intermediate portion of the outer link plate with respect to a rotational driving direction of the bicycle chain. This has the advantage of enabling the spacing between the upstream edge of the sprocket tooth and an interior surface of the chain to be reduced.

In a second aspect of the invention a bicycle chain is provided. The bicycle chain comprises a first inner link plate having a longitudinal centerline defining a longitudinal direction and comprising a first inner-link end portion including a first inner-link opening having a first inner-link center axis, a second inner-link end portion including a second inner-link opening having a second inner-link center axis parallel to the first inner-link center axis, and a first inner-link intermediate portion interconnecting the first inner-link end portion and the second inner-link end portion, the first inner-link end portion, the second inner-link end portion and the first inner-link intermediate portion defining a first inner-link outer peripheral edge comprising a first inner-link end edge extending about the first inner-link end portion, a second inner-link end edge extending about the second inner-link end portion, and a pair of first inner-link intermediate edges extending along the first inner-link intermediate portion between the first inner-link end edge and the second inner-link end edge, a first outer link plate comprising a first outer-link end portion including a first outer-link opening, a second outer-link end portion including a second outer-link opening and, a first outer-link intermediate portion interconnecting the first outer-link end portion and the second outer-link end portion, a first link pin configured to pass through the first inner-link opening and the first outer-link opening, wherein the first inner-link end portion has a first extended edge portion extending to be away from the second inner-link end portion in the longitudinal direction. One potential advantage of such a configuration is that the extended edge portion decreases the gap between an interior surface of the chain and a sprocket tooth when a pair of outer link plates is mated with the sprocket tooth. Therefore, the axial movement of the chain about the sprocket tooth is reduced, thereby decreasing the likelihood of the chain disengaging from the sprocket. As a result, chain operation is improved.

In the second aspect, the first extended edge portion may have a side surface configured to contact a sprocket tooth of a bicycle sprocket at an area axially adjacent to the first outer-link intermediate portion of the outer link plate while the bicycle chain engages with the bicycle sprocket. One advantage of such of configuration is that the spacing between an interior section of the chain and the sprocket tooth is substantially eliminated to further improve chain operation.

In the second aspect, the first inner-link end portion, the second inner-link end portion and the first inner-link intermediate portion may define a first inner-link outer peripheral edge comprising a first inner-link end edge extending about the first inner-link end portion, a second inner-link end edge extending about the second inner-link end portion, and a pair of first inner-link intermediate edges extending along the first inner-link intermediate portion between the first inner-link end edge and the second inner-link end edge. A first inner-link distance may be defined from the first inner-link center axis to an edge of the first extended edge portion in the first inner-link end edge, a second inner-link distance may be defined from the first inner-link center axis to the first inner-link end edge in an area except the first extended edge portion, and the first inner-link distance may be larger than the second inner-link distance. This has the advantage of enabling the extended portion of the inner link plate to extend into a gap between the sprocket tooth and an interior section of the chain to further reduce the likelihood of chain disengagement from the sprocket during chain operation.

In the second aspect, the second inner-link end portion may have a second extended edge portion extending to be away from the first inner-link end portion in the longitudinal direction, which has the advantage of decreasing the gap between an inner side of the chain at both a leading edge of the first sprocket tooth and a trailing edge of a second sprocket tooth during chain operation.

In the second aspect, the first inner-link end portion, the second inner-link end portion and the first inner-link intermediate portion may define a first inner-link outer peripheral edge comprising a first inner-link end edge extending about the first inner-link end portion, a second inner-link end edge extending about the second inner-link end portion, and a pair of first inner-link intermediate edges extending along the first inner-link intermediate portion between the first inner-link end edge and the second inner-link end edge. Further, a third inner-link distance may be defined from the second inner-link center axis to an edge of the second extended edge portion in the second inner-link end edge, a fourth inner-link distance may be defined from the second inner-link center axis to the second inner-link end edge in an area except the second extended edge portion, and the third inner-link distance may be larger than the fourth inner-link distance. This has the advantage of further decreasing play between the chain and the sprocket to further reduce the likelihood of chain disengagement from the sprocket.

In the second aspect, the first extended edge portion may be positioned outside a sprocket tooth of a bicycle sprocket in an axial direction with respect to the first inner-link center axis while the bicycle chain is equipped on a bicycle and engages with the sprocket tooth. This configuration has the advantage of enabling the extended portion of the link to axially limit the movement between the chain and the sprocket tooth when a pair of outer links in the chain is mated with the sprocket tooth. As a result, bicycle operation is improved.

In the second aspect, the first extended edge portion may extend from an upstream side toward the first outer-link intermediate portion of the first outer link plate with respect to a rotational driving direction of the bicycle chain. An advantage of such a configuration is that a section of the inner link plate extends into a gap between the sprocket tooth and an outer link plate. As a result, the clearance between the chain and the sprocket is further reduced.

In the second aspect, the first inner link plate further may comprise a first tubular portion extending axially with respect to the first inner-link center axis to surround the first inner-link opening, and the bicycle chain may further comprise a first chain roller configured to be mounted on the first tubular portion, the first chain roller having a first radially outer circumferential surface and a first radially inner circumferential surface configured to surround the first tubular portion. A first extended distance may be defined between an edge of the first extended edge portion and a part of the first radially outer circumferential surface of the first chain roller in the longitudinal direction when the first chain roller moves toward the second inner-link end portion in the longitudinal direction until the first radially inner circumferential surface of the first chain roller contacts the first tubular portion, the part of the first radially outer circumferential surface facing the first extended edge portion, and the first extended distance may be equal to or larger than 0.6 mm. This configuration has the advantage of enabling the inner link plate to be sized for specific sprocket tooth dimensions to further decrease play between the chain and sprocket tooth.

In the second aspect, the first extended distance may be equal to or larger than 1.5 mm, which has the advantage of enabling the inner link plate to be sized for specific sprocket tooth dimensions to further decrease play between the chain and sprocket tooth.

In the second aspect, the first extended distance is equal to or larger than 2.5 mm, which has the advantage of enabling the inner link plate to be sized for specific sprocket tooth dimensions to further decrease play between the chain and sprocket tooth.

In the second aspect, the first extended edge portion may be positioned outside a sprocket tooth of a bicycle sprocket in an axial direction with respect to the first inner-link center axis while the bicycle chain is equipped on a bicycle and engages with the sprocket tooth. This configuration has the advantage of enabling the extended portion of the inner link plate to axially limit the movement between the chain and the sprocket tooth when a pair of outer links is mated with the sprocket tooth.

In the second aspect, the first extended edge portion may extend from an upstream side toward the first outer-link intermediate portion of the first outer link plate with respect to a rotational driving direction of the bicycle chain. An advantage of this configuration is that a section of the inner link plate extends into a gap between the sprocket tooth and an outer link plate. As a result, the clearance between the chain and the sprocket is further reduced.

In the second aspect, the first inner link plate may further comprise a first tubular portion extending axially with respect to the first inner-link center axis to surround the first inner-link opening, and the bicycle chain may further comprise a first chain roller configured to be mounted on the first tubular portion. The first chain roller may have a first radially outer circumferential surface and a first radially inner circumferential surface to surround the first tubular portion. A first extended distance may be defined between an edge of the first extended edge portion and a part of the first radially outer circumferential surface of the first chain roller in the longitudinal direction when the first chain roller moves toward the second inner-link end portion in the longitudinal direction until the first radially inner circumferential surface of the first chain roller contacts the first tubular portion, the part of the first radially outer circumferential surface facing the first extended edge portion, and the first extended distance may be equal to or larger than 2.7 mm. This configuration has the advantage of enabling the inner link plate to be sized for specific sprocket tooth dimensions to further decrease play between the chain and sprocket tooth.

In the second aspect, the second inner-link end portion may have a second extended edge portion extending to be away from the first inner-link end edge in the longitudinal direction, the first inner link plate further may comprise a second tubular portion extending axially with respect to the second inner-link center axis to surround the second inner-link opening, and the bicycle chain further may comprise a second chain roller configured to be mounted on the second tubular portion, the second chain roller having a second radially outer circumferential surface and a second radially inner circumferential surface configured to surround the second tubular portion. A second extended distance may be defined between an edge of the second extended edge portion and a part of the second radially outer circumferential surface of the second chain roller in the longitudinal direction when the second chain roller moves toward the first inner-link end portion in the longitudinal direction until the second radially inner circumferential surface of the second chain roller contacts the second tubular portion, the part of the second radially outer circumferential surface facing the second extended edge portion, and the second extended distance may be equal to or larger than 0.6 mm. This configuration has the advantage of enabling the inner link plate to be sized for specific sprocket tooth dimensions to further decrease play between the chain and sprocket tooth.

In the second aspect, the second extended distance may be equal to or larger than 1.5 mm. This configuration has the advantage of enabling the inner link plate to be sized for specific sprocket tooth dimensions to further decrease play between the chain and sprocket tooth.

In the second aspect, the first second extended distance may be equal to or larger than 2.5 mm. This configuration has the advantage of enabling the inner link plate to be sized for specific sprocket tooth dimensions to further decrease play between the chain and sprocket tooth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 2-9C are drawn approximately to scale unless otherwise indicated. However, other relative dimensions may be used, if desired.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1A:
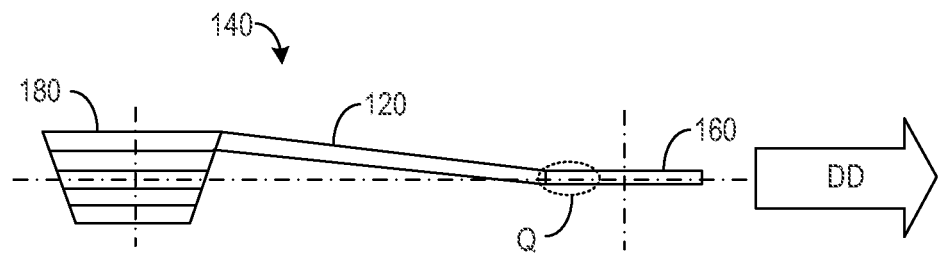
FIG. 1A shows a schematic plan view of a prior art drivetrain of a bicycle.
Figure 1B:
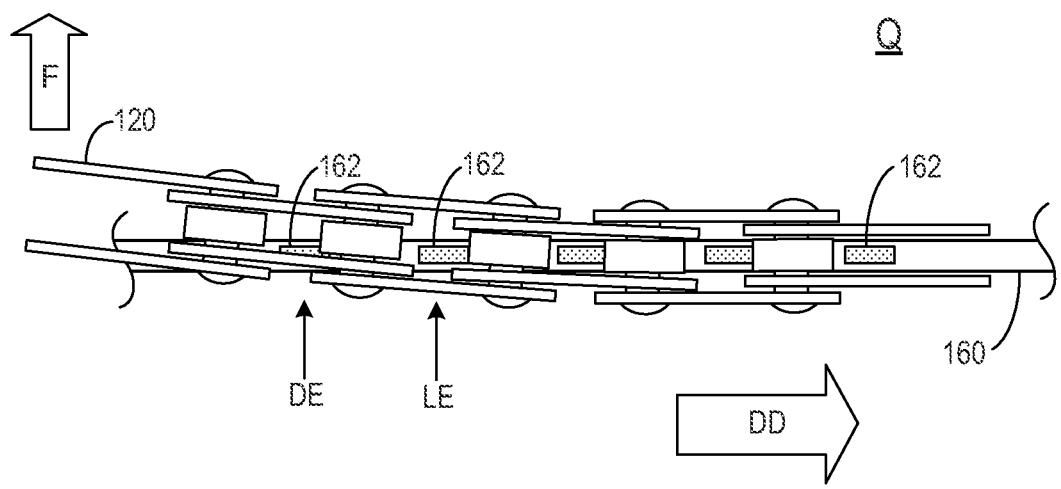
FIG. 1B shows an enlarged view of a part Q of the prior art drivetrain of FIG. 1A, showing relative movement of sprocket teeth with respect to outer link plate pairs and inner link plate pairs.
Figure 2:
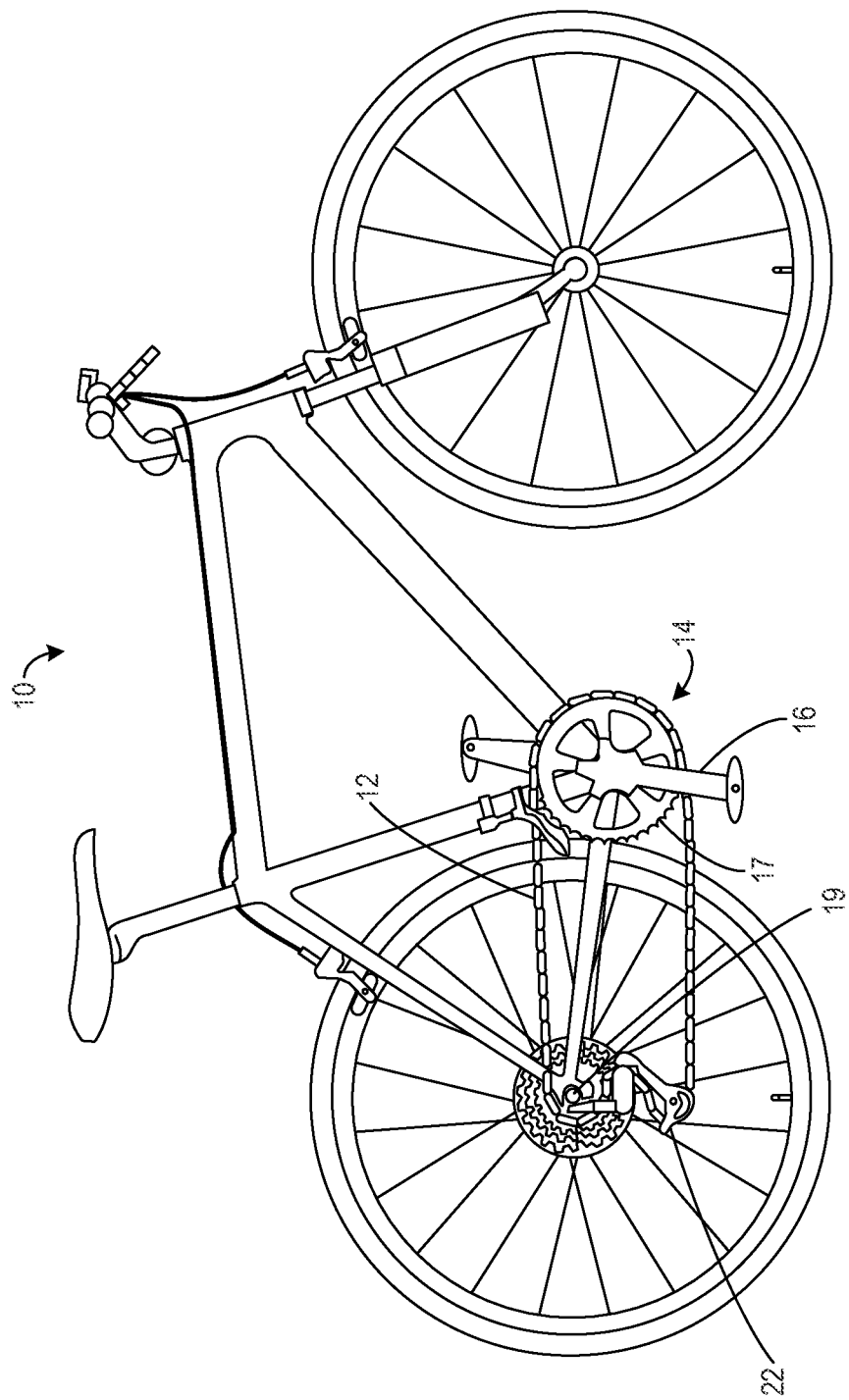
FIG. 2 shows a side view of a bicycle.

Referring initially to FIG. 2, an exemplary embodiment of a bicycle 10 is illustrated. The bicycle 10 uses a bicycle chain 12. The bicycle 10 includes, among other things, a drive train 14 configured to convert the rider's pedaling force into driving force to propel the bicycle along a surface, such as a road or trail. The chain 12 is included in the drive train 14. The drive train 14 also includes a front crankset 16, a rear sprocket assembly 18, and a rear derailleur 22. The rear sprocket assembly 18 may also be referred to as a rear sprocket set.

The front crankset 16 is mounted on a bottom bracket that is secured in a hanger on the bicycle frame and includes a single chainring or sprocket 17. However, other gearing configurations have been contemplated. For instance, the front crankset may include a plurality of chainrings. The rear sprocket assembly 18 is mounted to a freewheel or freehub of the rear wheel. The freewheel or freehub enables a rider to cease pedaling while the bicycle is in motion. Additionally, the rear sprocket assembly 18 includes a plurality of sprockets.

The chain 12 is arranged on the front sprocket 17 and the rear sprocket assembly 18 so as to extend therebetween. Thus, the chain 12 forms a loop around the front sprocket 17 and rear sprocket assembly 18 and engages with teeth in both front and rear sprockets. The rear derailleur 22 is configured to change gears by shifting the chain 12 in a lateral direction of the bicycle 10, which is an axial direction of the rear sprocket assembly 18. A lateral axis 19 extending into and out of the page is provided for reference. In this way, the rear derailleur is configured to adjust the gear ratio in the drivetrain.

Figure 3B:
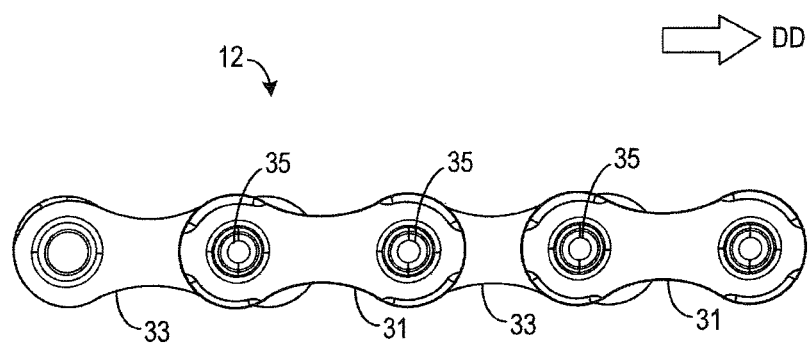
FIG. 3B is a side view of an embodiment of a chain having two sets of outer link plate pairs and two sets of inner link plate pairs which are alternately coupled.
Figure 8A:
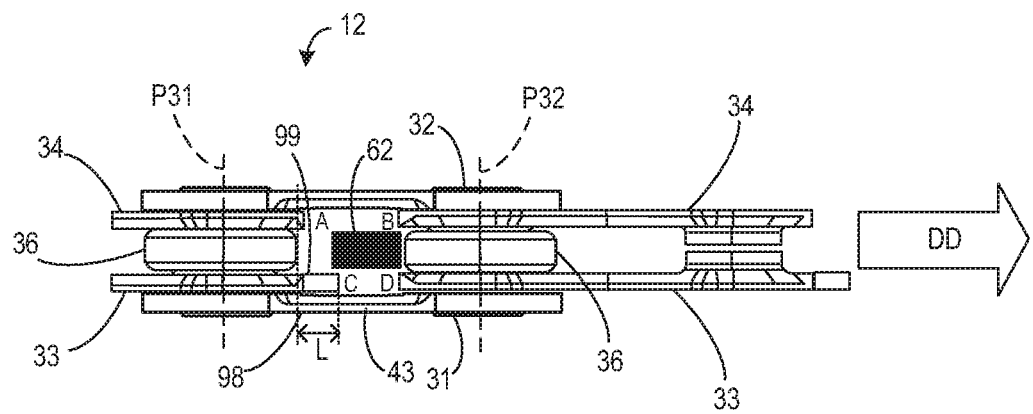
FIG. 8A shows an elevation view of the chain illustrated in FIG. 3B.

Referring now to FIGS. 3B and 8A, the chain 12 includes a plurality of first outer link plates 31 (e.g., first outside outer link plates), a plurality of second outer link plates 32 (e.g., second inside outer link plates), a plurality of first inner link plates 33 (e.g., first outside inner link plates), a plurality of second inner link plates 34 (e.g., second inside inner link plates), a plurality of pins or rivets 35 and a plurality of rollers 36.

Each opposed pair of the outer link plates 31 and 32 forms an outer link 37. Each opposed pair of the inner link plates 33 and 34 forms an inner link 38. The rollers 35 are loosely fitted onto the link pins 35, respectively, to surround the pins 35 so that each of the rollers 35 is freely rotatable around the link pin 35. In this way, the chain may pivot when travelling through the front and rear sprockets in the drivetrain.

The inner links 38 are interconnected in an alternating manner with the outer links 37 by the link pins 35. A master chain link (not shown) may interconnect two pairs of the inner links 38 together so as to form a single continuous chain loop. However, other chain attachment apparatuses have been contemplated.

The link pins 35 and the rollers 36 are metal parts. For instance, the link pins and the roller may be constructed out of steel or titanium. The link pins 35 may have a cylindrical shape. Furthermore, the roller 36 may be annular in shape. However it will be appreciated that these parts can vary as needed and/or desired based on desired end use characteristics. For example, the link pins 35 may be hollow pins or cylinders. Arrow 39 denotes an axial direction extending toward the bicycle frame when the chain is mounted in the bicycle drivetrain, shown in FIG. 2.

Figure 4A:
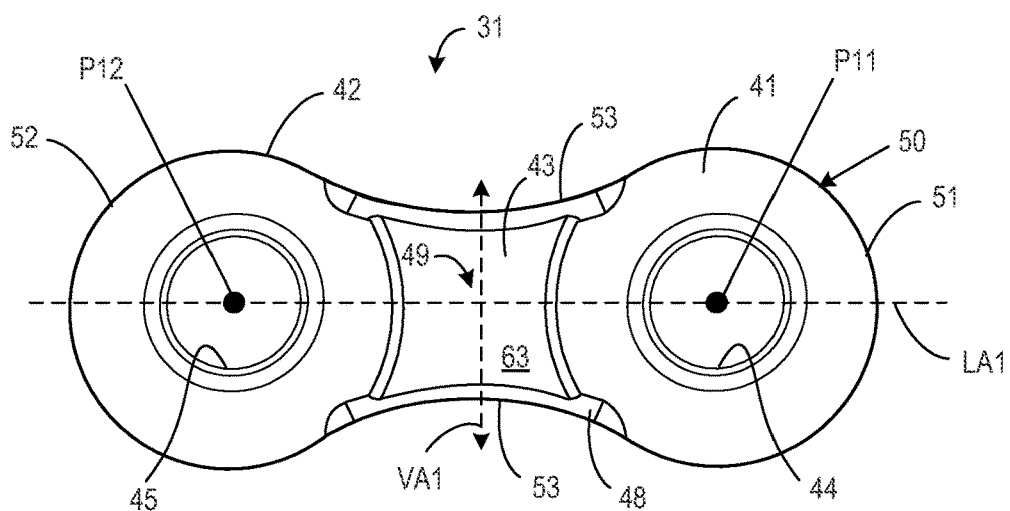
FIG. 4A shows an internal side view of one of the first outer link plates included in the chain shown in FIG. 3B.
Figure 4B:
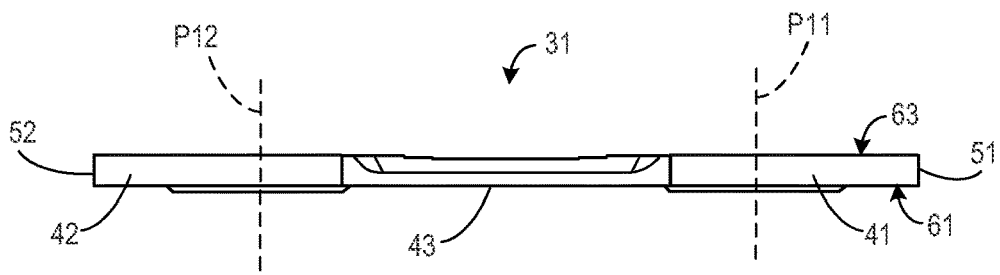
FIGS. 4B and 4C respectively show bottom and external side views of one of the first outer link plates included in the chain shown in FIG. 3B.
Figure 4C:
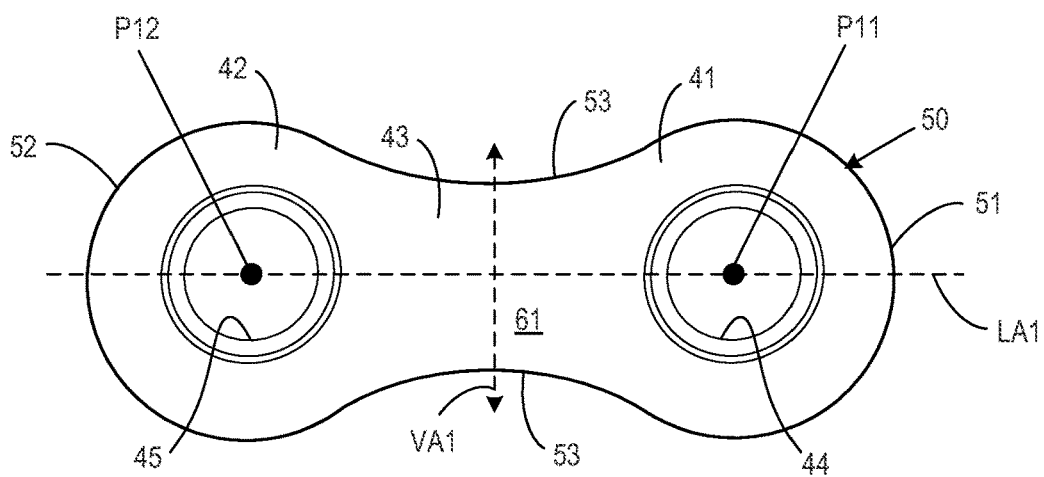

Now referring to FIGS. 4A, 4B, and 4C, these figures show one of the first outer link plates 31. It will be appreciated that each of the outer link plates 31 may be substantially identical in size and geometry, in one example. As illustrated, each of the first outer link plates 31 includes a first end portion 41, a second end portion 42 and an intermediate portion 43 interconnecting the first and second end portions 41 and 42. The portions 41 to 43 of each of the first outer link plates 31 may be formed as a one-piece, unitary member from a hard, rigid material, such as a metallic material. For instance, the first outer link plates 31 may be constructed out of steel, titanium, etc. The first end portion 41 also has a pin coupling opening 44 for receiving one of the link pins 35 therein. Likewise, the second end portion 42 also has a pin coupling opening 45 for receiving one of the link pins 35 therein. In the depicted example, the pin coupling openings have a circular axial cross-section. The ends of the link pins 35 are deformed for fixedly securing the first and second outer link plates 31 and 32 thereto. The pin coupling openings 44 and 45 have center points that define first and second outer-link center axes P11 and P12. A longitudinal axis LA1 of the first outer link plate 31 bisects the intermediate portion 43 and the pin coupling openings 44 and 45. In other words, the longitudinal axis LA1 passes through the center axes P11 and P12 of the pin coupling openings 44 and 45. A vertical axis VA1 is also provided for reference. As shown, the outer link plate 31 is symmetric about the vertical axis VA1 as well as the longitudinal axis LA1.

The first and second end portions 41 and 42 and the intermediate portion 43 of the first outer link plate 31 define a peripheral edge 50. The peripheral edge 50 delineates the contour of the first outer link plate 31. The outer-link peripheral edge 50 includes a first end edge 51 extending around the first end portion 41, a second end edge 52 extending around the second end portion 42, and a pair of intermediate edges 53 positioned on opposite sides of the intermediate portion 43 with respect the longitudinal axis LA1. Additionally, the intermediate edges extend from the first end portion to the second end portion.

The first outer link plate 31 has an exteriorly facing surface 61 that faces away from the second counterpart outer link plate 32 and an interiorly facing surface 63 that faces towards the second counterpart outer link plate 32. In other words, the term "exteriorly facing" or "interiorly facing," or "exterior" or "interior" as used herein refer to directions relative to the chain 12 and not the bicycle 10. The portions 41, 42, and 43 of the first outer link plate 31 have substantially identical thickness between the exteriorly and interiorly facing surfaces, excluding interiorly facing chamfered edge portions 48 formed along the intermediate edges 53 and/or a recessed portion 49 formed on the interior surface of the first outer link plate 31, which aid in shifting gears by reducing interference with the sprocket teeth.

Note that the second outer link plate 32 is identical to the first outer link plate 31 in this embodiment and, thus, the detailed configuration of the second outer link plate 32 will be omitted herein. The outer link plates 31 and 32 are coupled to form the outer link 37 as described above, while the interior surfaces 63 facing to each other.

Figure 5A:
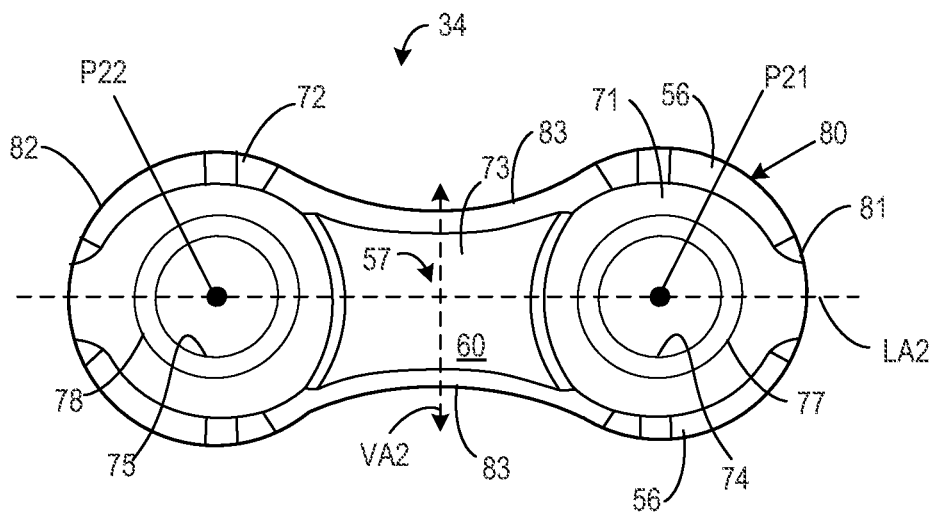
FIGS. 5A-5C respectively show internal side, bottom, and external side views of one of the second inner link plates.
Figure 5B:
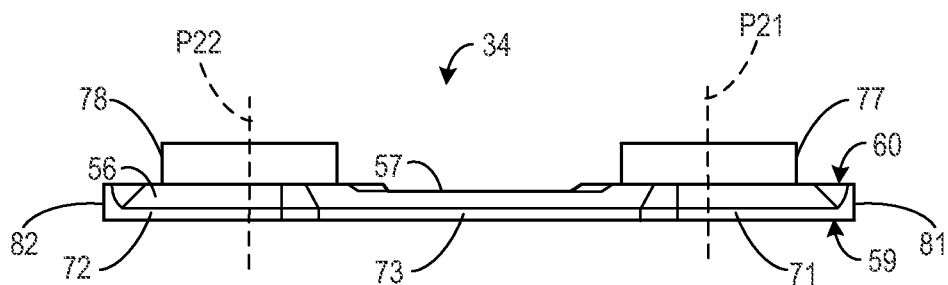
Figure 5C:
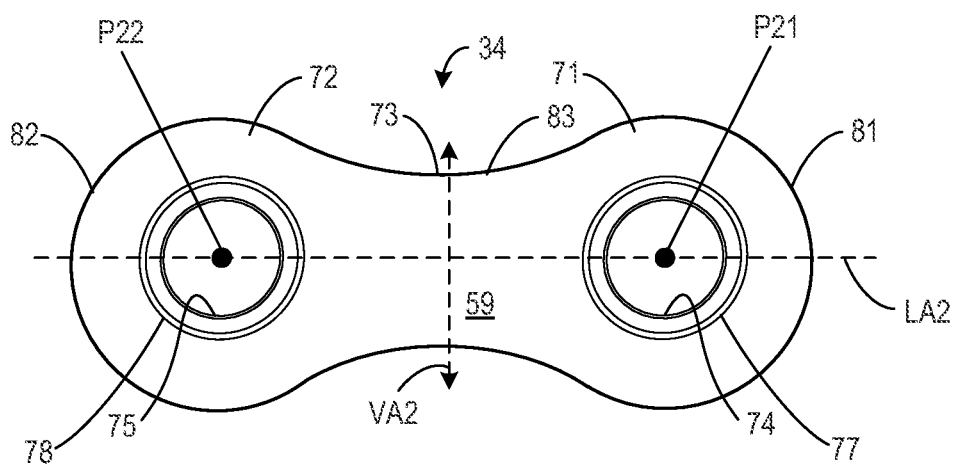

Now referring to FIGS. 5A, 5B, and 5C, each of the second inner link plates 34 includes a first end portion 71, a second end portion 72, and an intermediate portion 73 interconnecting the first and second end portions 71 and 72. The portions 71 to 73 of each of the second inner link plates 34 may be formed as a one-piece, unitary member from a hard, rigid material such as a metallic material (e.g., steel or titanium). The first end portion 71 also has a pin coupling opening 74 for receiving one of the link pins 35 therein. Likewise, the second end portion 72 also has a pin coupling opening 75 for receiving one of the link pins 35 therein. It will be appreciated that the aforementioned pin coupling openings may be referred to as a first inner-link opening and a second inner-link opening, in one example. As illustrated, the pin coupling openings have a circular axial cross-sectional geometry. The pin coupling openings 74 and 75 have center points that define first and second inner-link center axes P21 and P22. The center axes P21 and P22 are parallel to one another, in the depicted example. A longitudinal axis LA2 of the second inner link plate 34 bisects the intermediate portion 73 and the pin coupling openings 74 and 75. Thus, the longitudinal axis LA2 passes through the center axes P21 and P22 of the pin coupling openings 74 and 75. The longitudinal axis LA2 may be a longitudinal centerline. A vertical axis VA2 bisects the longitudinal axis LA2. Specifically, the vertical axis VA2 is perpendicular to the longitudinal axis LA2. Furthermore, the second inner link plate 34 is symmetric about the vertical axis VA2 and the longitudinal axis LA2. However, other second inner link plate geometries have been contemplated.

The first and second end portions 71 and 72 and the intermediate portion 73 of the second inner link plate 34 define a peripheral edge 80. The peripheral edge 80 delineates the contour of the second inner link plate 34. The inner-link peripheral edge 80 includes a first end edge 81 extending around the first end portion 71, a second end edge 82 extending around the second end portion 72, and a pair of intermediate edges 83 are positioned on opposite sides of the intermediate portion 73 with respect the longitudinal axis LA2.

The second inner link plate 34, shown in FIGS. 5A-5C, has an exteriorly facing surface 59 that faces away from the first counterpart inner link plate 33, shown in FIGS. 6A-7C discussed in greater detail herein. The second inner link plate 34 additionally includes an interiorly facing surface 60 that faces the first counterpart inner link plate 33. The portions 71, 72, and 73 of the second inner link plate 34 have substantially identical thickness between the exteriorly and interiorly facing surfaces, excluding interiorly facing chamfered edge portions 56 formed along substantially the entire peripheral edge 80 and/or a recessed portion 57 formed on the interior surface of the second inner link plate 34. The chamfered edge portions improve gear shifting by reducing interference with the sprocket teeth.

A first annular tubular extension 77 is provided around the pin coupling opening 74, and a second annular tubular extension 78 is provided around the pin coupling opening 75.

Now referring to FIGS. 6A, 6B, 7A, 7B, and 7C, each of the first inner link plates 33 includes a first end portion 85, a second end portion 86 and an intermediate portion 87 interconnecting the first and second end portions 85 and 86. The portions 85, 86, and 87 of each of the first inner link plates 33 may be formed as a one-piece, unitary member from a hard, rigid material such as a metallic material (e.g., steel and/or titanium). The first end portion 85 also has a pin coupling opening 88 for receiving one of the link pins 35 therein. Likewise, the second end portion 86 also has a pin coupling opening 89 for receiving one of the link pins 35 therein. The pin coupling openings 88 and 89 have center points that define first and second inner-link center axes P31 and P32. Furthermore, the pin coupling openings 88 and 89 have a circular axial cross-sectional geometry. A longitudinal axis LA3 of the first inner link plate 33 bisects the intermediate portion 87 and the pin coupling openings 88 and 89. Therefore, the longitudinal axis LA3 passes through the center axes P31 and P32 of the pin coupling openings 88 and 89.

The first and second end portions 85 and 86 and the intermediate portion 87 of the first inner link plate 33 define a peripheral edge 90 that delineates the contour of the first inner link plate 33. The inner-link peripheral edge 90 includes a first end edge 91 extending around the first end portion 85, a second end edge 92 extending around the second end portion. 86, and a pair of intermediate edges 93 extending opposite sides of the intermediate portion 87 with respect the longitudinal axis LA3.

The first inner link plate 33 has an exteriorly facing surface 94 that faces away from the second counterpart inner link plate, such as the second inner link plate 34 shown in FIGS. 5A-5C, and an interiorly facing surface 95 that faces towards the second counterpart inner link plate. The portions 85, 86, and 87 of the first inner link plate 33 have a substantially identical thickness between the exteriorly and interiorly facing surfaces, excluding interiorly facing chamfered edge portions 110 formed along substantially the entire peripheral edge 90 and/or a recessed portion 111 formed on the interior surface of the first inner link plate 33. The chamfered edge portions 110 improve gear shifting by reducing interference with the sprocket teeth.

A first annular tubular extension 96 is provided around the pin coupling opening 88, and a second annular tubular extension 97 is provided around the pin coupling opening

89. Each of the rollers 36, may be loosely fitted onto the opposing pair of tubular extensions 96 and the opposing pair of tubular extensions 97 of the pair of inner link plates 33 and 34.

Figure 6A:
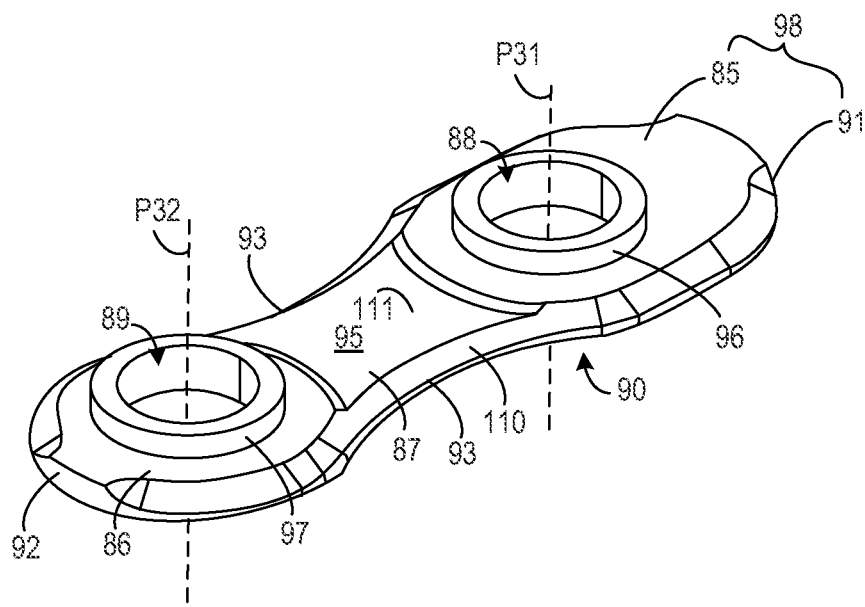
FIG. 6A shows a perspective view of one of the first inner link plates in the chain depicted in FIG. 3B.
Figure 6B:
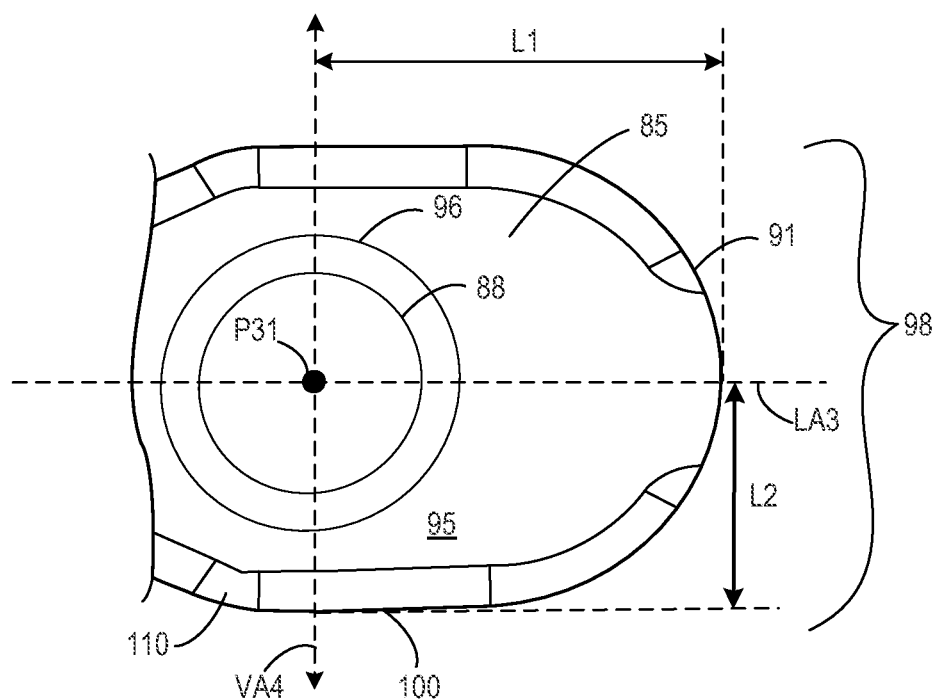
FIG. 6B shows an expanded view of a portion of the first inner link plate depicted in FIG. 6A.
Figure 7A:
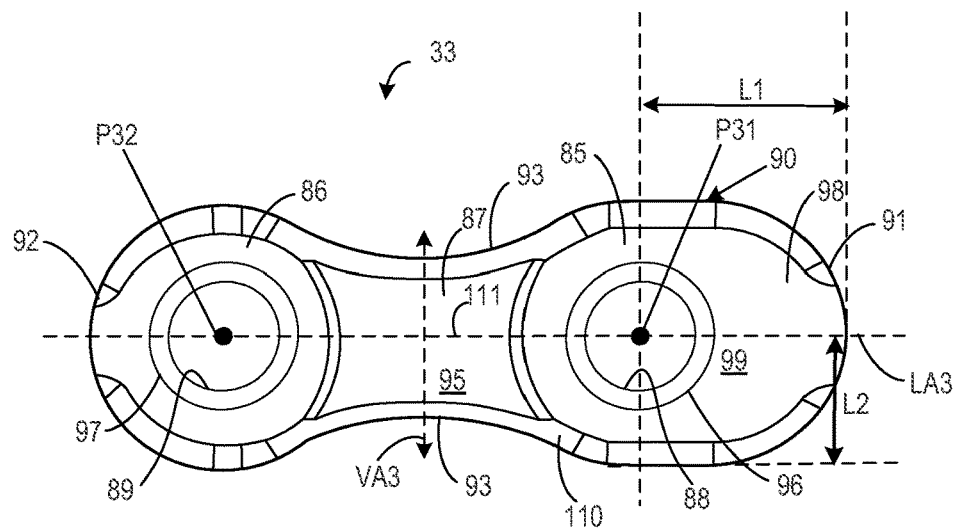
FIGS. 7A-7C respectively show internal side, bottom, and external side views of the first inner link plate illustrated in FIGS. 6A and 6B.
Figure 7B:
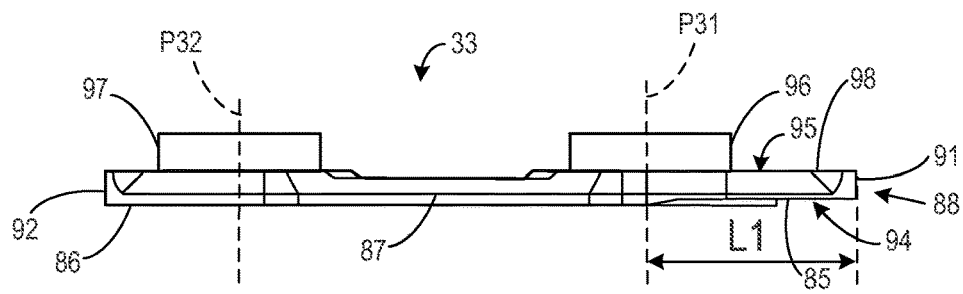

Continuing with FIGS. 6A, 6B, 7A, 7B, and 7C, the first inner link plates 33 has the first end portion 85 larger than the second opposite end portion 86 in this exemplary embodiment. Particularly, the first end portion 85 has an extended edge portion 98 extending away from the second end portion 86. The extended edge portion 98 is formed such that the first end portion 85 is extended, with respect to the second opposite end portion 86, in the longitudinal direction LA3 so that the width of both the end portions 85 and 86 are still the same in the width direction of the first inner link plates 33 perpendicular to both the longitudinal direction LA3 and the center axes P31 and P32. That is to say that the first inner link plate 33 is not symmetric about a vertical axis VA3. As shown in FIGS. 6B and 7B, a first inner-link distance L1 is defined from the first center axis P31 to an edge of the extended edge portion 98 in the longitudinal direction LA3, and a second inner-link distance L2 is defined from the first center axis P31 to the first inner-link edge in an area except for the first extended edge portion 98 (e.g. from the center axis P31 of the first end portion 85 to an edge 100 of the first end portion 85 in the vertical direction perpendicular to the center axis P31 and the longitudinal direction LA3). In this embodiment, the first and second distances L1 and L2 have a relation therebetween to be L1>L2.

Furthermore, the distance between the extended edge portion 98 and the center axis P31 to the first end edge 91 decreases in a direction toward a vertical axis VA4 and increased in a direction toward the longitudinal axis LA3. In this way, the distance between the center axis P31 and the peripheral edge of the link varies to form the extended edge portion 98.

Figure 7C:
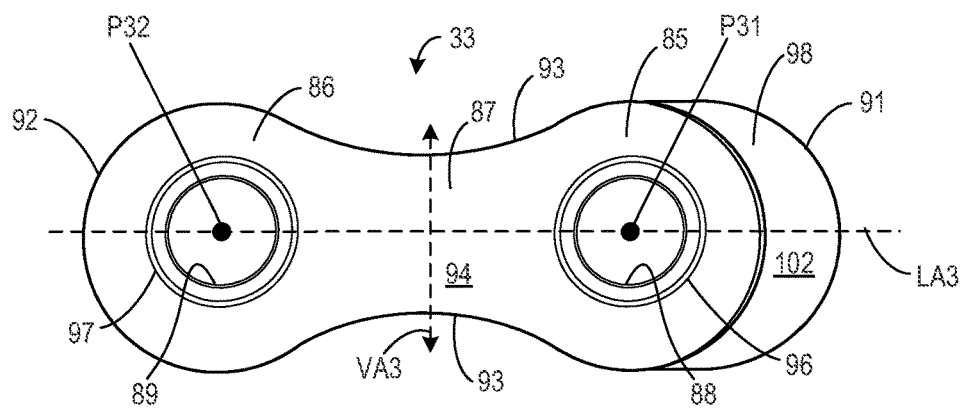

In this embodiment, an edge area of the extended edge portion 98 near the longitudinal axis LA3 is not chamfered, but other edge areas of the extended edge portion 98 are chamfered on the interior side 93 to aid in shifting. Further, as shown in FIGS. 7B and 7C, the extended edge portion 98 may have a slightly smaller thickness than other part of the first end portion 85. In detail, the extended edge portion 98 may have a stepped portion 102 on the exteriorly facing surface 94 to avoid an interference with the outer link plate to reduce friction therebetween to ensure a smooth movement of the chain 12.

FIG. 8A shows an elevation view of the chain 12 mated with a sprocket tooth 62. It will be appreciated, that the sprocket tooth may be included in a sprocket in the bicycle 10 shown in FIG. 2, such as the front sprocket 17. As shown in FIG. 8A, the first inner link plates 33 are included in the chain 12. The extended edge portion 98 is adjacent to the sprocket tooth 62 in the lateral direction (e.g., along the axis P31). Positioning the extended edge portion 98 in this way decreases the likelihood of the chain falling off of a sprocket which includes the sprocket tooth 62. Additionally, the extended edge portion 98 may be positioned between the sprocket tooth 62 and the intermediate portion 43 of the first outer link plate 31. Additionally, the extended edge portion 98 has a side surface 99, shown in FIG. 8A as well as FIG. 7A. In one example, the side surface 99 may be configured to contact the sprocket tooth 62. Additionally in one example, the side surface 99 may extend into an area axially adjacent to the intermediate portion 43 of the first outer link plate 31 while the chain 12 engages with the sprocket tooth 62.

In the depicted embodiment, the extended edge portion 98 extends from an upstream side of the rotational driving direction DD toward the intermediate portion of the outer link plate 31. Further in the embodiment illustrated in FIG. 8A, the extended edge portion 98 is preferably positioned in area C. However, it will be appreciated that the inner link plates 32 and/or 33 may be modified such that they include extended edge portions positioned in one or more of the areas A-D. Specifically, in one example, extended edge portions included in the inner link plates may be positioned in area C and/or D, to further reduce the likelihood of the chain 12 falling off of a sprocket which includes the sprocket tooth 62.

When an extended edge portion is positioned in area A, the second inner link plates 34 may additional or alternatively include an extended edge portion. The extended edge portion included in the second inner link, plates 34 may have a similar geometry to the extended edge portion 98. Similarly, areas B and/or D may also have extended edge portions positioned therein. It will be appreciated that the first and/or second inner link plates (33 and 34) may be modified to provide this configuration, in some examples. In yet another example, extended edge portions may be positioned in areas A and B and/or C and D. In such an example, extended edge portions may be formed on both ends of the first inner link plates 33 and/or the second inner link plates 34.

Figure 9A:
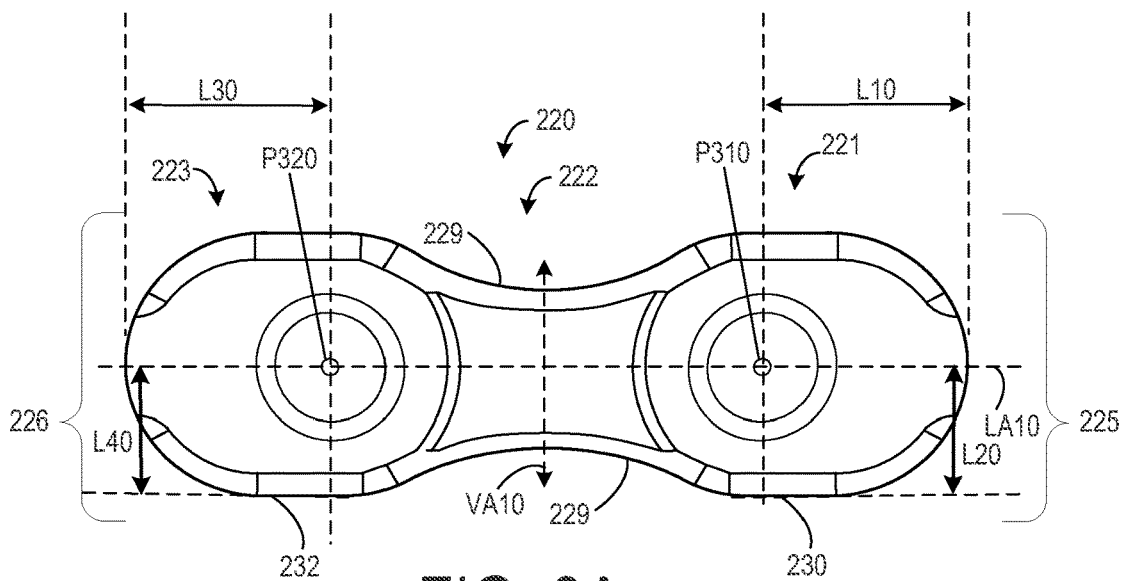
FIGS. 9A-9C respectively show internal side, bottom, and external side views of an alternative first inner link plate that may be included in the chain shown in FIG. 3B.
Figure 9B:
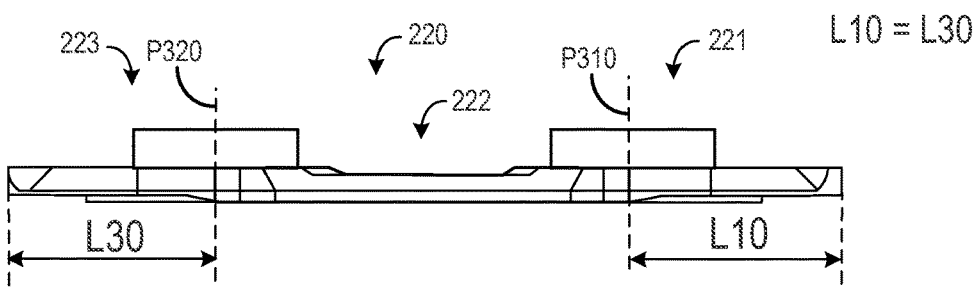
Figure 9C:
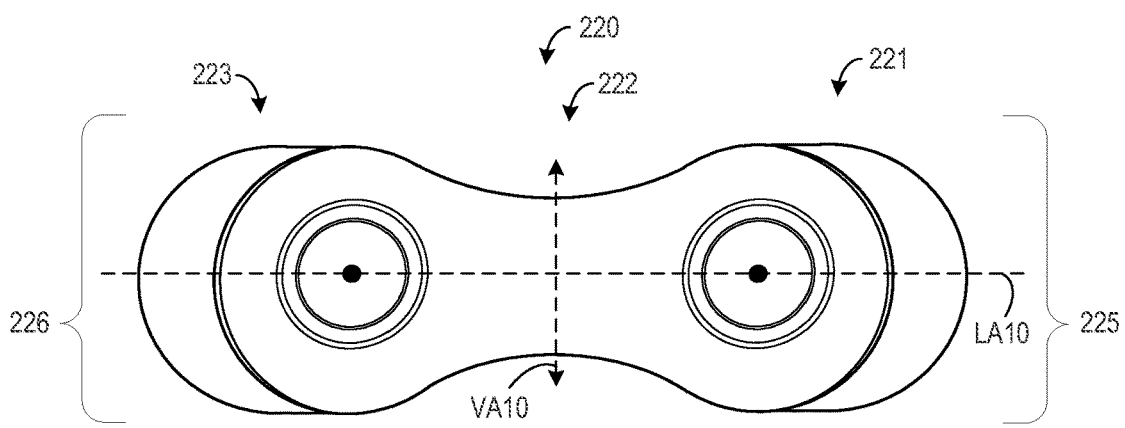

FIGS. 9A-9C show different views of an inner link plate with extended edge portions at both ends. Specifically, an inner link plate 220 having a first end portion 221, an intermediate portion 222, and a second end portion 223, is illustrated. It will be appreciated that the inner link plate 220 may replace the first inner link plates 33 and/or the second inner link plates 34 in the chain shown in FIGS. 3B and 8A in one example.

As illustrated, the intermediate portion 222 is substantially identical in geometry to the intermediate portion 87, shown in FIGS. 7A-7C. Therefore, the geometric characteristics of the intermediate portion 87 discussed above may be equally applied to the intermediate portion 222, shown in FIGS. 9A-9C. Therefore, the intermediate portion 222 has a pair of intermediate edges 229. Additionally, the first end portion 221 is substantially identical in geometry to the first end portion 85 shown in FIGS. 7A-7C. Thus, the first end portion 221 includes an extended edge portion 225 (i.e., a first extended edge portion).

Furthermore, the second end portion 223 is substantially identical in geometry to first end portion 222 and therefore includes an additional extended edge portion 226 (i.e. a second extended edge portion). Thus, the inner link plate 220 is symmetric about a vertical axis VA10. Additionally, the inner link plate 220 may also be symmetric about a longitudinal axis LA10. However, other geometries of the inner link plate 220 have been contemplated. Additionally, the distances L30 and L10 shown in FIG. 9B are substantially equivalent, in the depicted example. As shown in FIG. 9A a first inner-link distance L10 is defined from a first center axis P310 to an edge of the extended edge portion 225 in the longitudinal direction LA10, and a second inner-link distance L20 is defined from the first center axis P310 to the first inner-link edge in an area except for the first extended edge portion 225 (e.g. from the center axis P310 of the first end portion to an edge 230 of the first end portion 221 in the vertical direction perpendicular to the center axis P310 and the longitudinal direction LA10). In this embodiment, the first and second distances L10 and L20 have a relation therebetween to be L10≥L20.

As shown in FIG. 9A, a third inner-link distance L30 is defined from the second center axis P320 to an edge of the extended edge portion 226 in the longitudinal direction LA10, and a fourth inner-link distance L40 is defined from the second center axis P320 to the second inner-link edge in an area except for the extended edge portion 226 (e.g., from the center axis P320 of the second end portion to an edge 232 of the second end portion 223 in the vertical direction perpendicular to the center axis P320 and the longitudinal direction LA10). In this embodiment, the third and fourth distances L30 and L40 have a relation therebetween to be L30>L40. Additionally in this embodiment, the first distance L10 and third distance L30 have a relation therebetween to be L10=L30. Further in this embodiment, the second distance L20 and the fourth distance L40 have a relation therebetween to be L20=L40. However, other proportionalities have been contemplated.

Figure 8B:
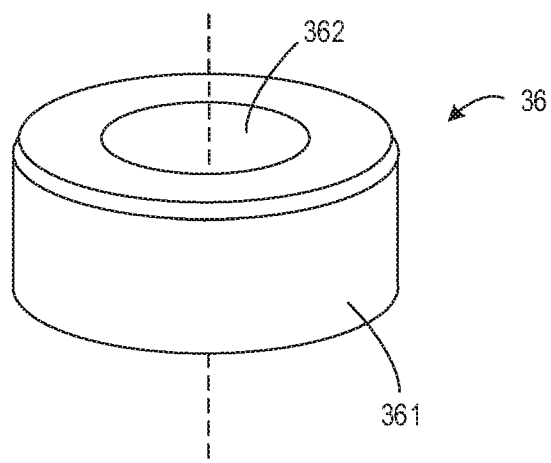
FIG. 8B shows a roller included in the chain shown in FIG. 3B.

Returning to FIG. 8A, an extended distance L of the extended edge portion 98 is defined between an edge of the extended edge portion 98 and a part of the radially outer circumferential surface 361, shown in FIG. 8B, of the roller 36 in the longitudinal direction LA2 of the first inner link plate 33 when the roller 36 moves, due to its backlash, toward the second end portion of the first inner link plate 33 in the longitudinal direction LA2 until the radially inner circumferential surface 362 of the roller 36 contacts the tubular portion 96 of the inner link plate 33 shown in FIG. 7C, to which the roller 36 is mounted so that the part of the radially outer circumferential surface 361 faces the extended edge portion 98.

In such a case the extended distance L may be equal to or larger than 0.6 mm. In another example, the extended distance L may be equal to or larger than 1.5 mm. Further in another example, the extended distance L may be equal to or larger than 2.5 mm. In yet another example the extended distance may be equal to or larger than 2.7 mm. As the distance L becomes larger, the likelihood of the chain 12 falling of the sprocket decreases.

As shown in FIG. 8B, the rollers 36 have a cylindrical shape. Additionally, the rollers 36 have a radially outer circumferential surface 361 and a radially inner circumferential surface 362. As previously described, the inner diameter defined by the inner circumferential surface 362 is configured to be slightly larger than the outer diameter of the tabular portions of the inner link plates 33 and 34. Thus, when the rollers 36 are mounted onto the tubular portions, the inner circumferential surfaces 362 loosely surround the tubular portions to enable the rotation of the rollers 36 around the tubular portions.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The terms of degree such as "substantially", "about" and "approximately" as used herein mean a reasonable amount of deviation of the modified term such that the end result is not significantly changed (e.g., manufacturing tolerances).

While specific embodiments of the bicycle and bicycle chain have been described in detail, the particular arrangements disclosed are meant to be illustrative only and not limiting. The features of the various embodiments described above, as well as modifications thereof, may be variously combined without departing from the scope of this disclosure.

The invention claimed is:
1. A bicycle chain comprising:
a first inner link plate having a longitudinal centerline defining a longitudinal direction and comprising:
a first inner-link end portion including a first inner-link opening having a first inner-link center axis;
a second inner-link end portion including a second inner-link opening having a second inner-link center axis parallel to the first inner-link center axis; and
a first inner-link intermediate portion interconnecting the first inner-link end portion and the second inner-link end portion, the first inner-link end portion, the second inner-link end portion and the first inner-link intermediate portion defining a first inner-link outer peripheral edge comprising:
a first inner-link end edge extending about the first inner-link end portion;
a second inner-link end edge extending about the second inner-link end portion; and
a pair of first inner-link intermediate edges extending along the first inner-link intermediate portion between the first inner-link end edge and the second inner-link end edge;
a first outer link plate comprising:
a first outer-link end portion including a first outer-link opening,
a second outer-link end portion including a second outer-link opening, and
a first outer-link intermediate portion interconnecting the first outer-link end portion and the second outer-link end portion;
a first single cylindrical link pin configured to pass through the first inner-link opening and the first outer-link opening; and
a second single cylindrical link pin configured to pass through the second inner-link opening and the second outer-link opening; wherein
the first inner-link end portion has a first extended edge portion extending to be away from the second inner-link end portion in the longitudinal direction;
wherein the extended edge portion comprises a stepped portion in an exteriorly facing surface thereof, a thickness of the stepped portion being smaller than a thickness of another portion of the first inner-link end portion that is adjacent the stepped portion in the longitudinal direction;
a first inner-link distance is defined in the longitudinal direction from the first inner-link center axis to the first inner-link end edge about the first extended edge portion;
a second inner-link distance is defined in a lateral direction, perpendicular to the longitudinal direction, from the first inner-link center axis to a first lateral point defined on the first inner-link end edge in an area outside the first extended edge portion on one side of the longitudinal centerline;
a second lateral point is defined on the first inner-link end edge on another side of the longitudinal centerline at which the lateral direction from the first inner-link center axis, perpendicular to the longitudinal direction, intersects with the first inner-link end edge;
the first inner-link distance is larger than the second inner-link distance; and
the extended edge portion is configured to surround the first inner-link end portion from the first lateral point to the second lateral point.

2. The bicycle chain according to claim 1, wherein the second inner-link end portion has a second extended edge portion extending to be away from the first inner-link end portion in the longitudinal direction.

3. The bicycle chain according to claim 2, wherein
a third inner-link distance is defined from the second inner-link center axis to an edged of the second extended edge portion in the second inner-link end edge;
a fourth inner-link distance is defined from the second inner-link center axis to the second inner-link end edge in an area except the second extended edge portion; and
the third inner-link distance is larger than the fourth inner-link distance.

4. The bicycle chain according to claim 1, wherein the first extended edge portion is positioned outside a sprocket tooth of a bicycle sprocket in an axial direction with respect to the first inner-link center axis while the bicycle chain is equipped on a bicycle and engages with the sprocket tooth.

5. The bicycle chain according to claim 4, wherein the first extended edge portion extends from an upstream side toward the first outer-link intermediate portion of the first outer link plate with respect to a rotational driving direction of the bicycle chain.

6. The bicycle chain according to claim 1, wherein
a first extended distance is defined in the longitudinal direction between an edge of the first extended edge portion and a part of a first radially outer circumferential surface of a first chain roller, the part of the first radially outer circumferential surface of the first chain roller facing the first extended edge portion, when the first chain roller has moved toward the second inner-link end portion in the longitudinal direction until a first radially inner circumferential surface of the first chain roller contacts a first tubular portion extending axially with respect to the first inner-link center axis to surround the first inner-link opening; and
the first extended distance is equal to or larger than 1.5 mm.

7. The bicycle chain according to claim 1, wherein the first extended edge portion is positioned outside a sprocket tooth of a bicycle sprocket in an axial direction with respect to the first inner-link center axis while the bicycle chain is equipped on a bicycle and engages with the sprocket tooth.

8. The bicycle chain according to claim 7, wherein the first extended edge portion extends from an upstream side toward the first outer-link intermediate portion of the first outer link plate with respect to a rotational driving direction of the bicycle chain.

9. The bicycle chain according to claim 1, wherein
the second inner-link end portion has a second extended edge portion extending to be away from the first inner-link end edge in the longitudinal direction;
the first inner link plate further comprises a second tubular portion extending axially with respect to the second inner-link center axis to surround the second inner-link opening;
the bicycle chain further comprises a second chain roller configured to be mounted on the second tubular portion, the second chain roller having a second radially outer circumferential surface and a second radially inner circumferential surface configured to surround the second tubular portion;
an inner diameter of the second radially inner circumferential surface is configured to be larger than an outer diameter of the second tubular portion, so as to enable free rotation and longitudinal movement of the second chain roller about the second tubular portion;
a second extended distance is defined in the longitudinal direction between an edge of the second extended edge portion and a part of the second radially outer circumferential surface of the second chain roller, the part of the second radially outer circumferential surface of the second chain roller facing the second extended edge portion, when the second chain roller has moved toward the first inner-link end portion in the longitudinal direction until the second radially inner circumferential surface of the second chain roller contacts the second tubular portion; and
the second extended distance is equal to or larger than 0.6 mm.

10. The bicycle chain according to claim 9, wherein the second extended distance is equal to or larger than 1.5 mm.

11. The bicycle chain according to claim 9, wherein, the second extended distance is equal to or larger than 2.5 mm.

12. A bicycle chain comprising:
a first inner link plate having a longitudinal centerline defining a longitudinal direction and comprising:
a first inner-link end portion including a first inner-link opening having a first inner-link center axis;
a second inner-link end portion including a second inner-link opening having a second inner-link center axis parallel to the first inner-link center axis; and
a first inner-link intermediate portion interconnecting the first inner-link end portion and the second inner-link end portion, the first inner-link end portion, the second inner-link end portion and the first inner-link intermediate portion defining a first inner-link outer peripheral edge comprising:
a first inner-link end edge extending about the first inner-link end portion;
a second inner-link end edge extending about the second inner-link end portion; and
a pair of first inner-link intermediate edges extending along the first inner-link intermediate portion between the first inner-link end edge and the second inner-link end edge;
a first outer link plate comprising:
a first outer-link end portion including a first outer-link opening,
a second outer-link end portion including a second outer-link opening, and
a first outer-link intermediate portion interconnecting the first outer-link end portion and the second outer-link end portion;
a first single cylindrical link pin configured to pass through the first inner-link opening and the first outer-link opening; and
a second single cylindrical link pin configured to pass through the second inner-link opening and the second outer-link opening; wherein
the first inner-link end portion has a first extended edge portion extending to be away from the second inner-link end portion in the longitudinal direction;
the first inner link plate further comprises a first tubular portion extending axially with respect to the first inner-link center axis to surround the first inner-link opening;
the bicycle chain further comprises a first chain roller configured to be mounted on the first tubular portion, the first chain roller having a first radially outer circumferential surface and a first radially inner circumferential surface configured to surround the first tubular portion;

an inner diameter of the first radially inner circumferential surface is configured to be larger than an outer diameter of the first tubular portion, so as to enable free rotation and longitudinal movement of the first chain roller about the first tubular portion;

a first extended distance is defined in the longitudinal direction between an edge of the first extended edge portion and a part of the first radially outer circumferential surface of the first chain roller, the part of the first radially outer circumferential surface of the first chain roller facing the first extended edge portion, when the first chain roller has moved toward the second inner-link end portion in the longitudinal direction until the first radially inner circumferential surface of the first chain roller contacts the first tubular portion;

the first extended distance is equal to or larger than 0.6 mm;

wherein the extended edge portion comprises a stepped portion in an exteriorly facing surface thereof, a thickness of the stepped portion being smaller than a thickness of another portion of the first inner-link end portion that is adjacent the stepped portion in the longitudinal direction;

a first inner-link distance is defined in the longitudinal direction from the first inner-link center axis to the first inner-link end edge about the first extended edge portion;

a second inner-link distance is defined in a lateral direction, perpendicular to the longitudinal direction, from the first inner-link center axis to a first lateral point defined on the first inner-link end edge in an area outside the first extended edge portion on one side of the longitudinal centerline;

a second lateral point is defined on the first inner-link end edge on another side of the longitudinal centerline at which the lateral direction from the first inner-link center axis, perpendicular to the longitudinal direction, intersects with the first inner-link end edge;

the first inner-link distance is larger than the second inner-link distance; and the extended edge portion is configured to surround the first inner-link end portion from the first lateral point to the second lateral point.

13. The bicycle chain according to claim 12, wherein the first extended distance is equal to or larger than 2.5 mm.

14. The bicycle chain according to claim 12, wherein the first extended distance is equal to or larger than 2.7 mm.

15. An inner link plate for a bicycle chain, the inner link plate having a longitudinal centerline defining a longitudinal direction and comprising:

a first inner-link end portion including a first inner-link opening having a first inner-link center axis;

a second inner-link end portion including a second inner-link opening having a second inner-link center axis parallel to the first inner-link center axis; and a first inner-link intermediate portion interconnecting the first inner-link end portion and the second inner-link end portion, the first inner-link intermediate portion having a vertical axis at a midpoint between the first inner-link center axis and the second inner-link center axis on the longitudinal centerline, wherein the first inner-link end portion has an extended edge portion extending to be away from the second inner-link end portion in the longitudinal direction, so that a length in the longitudinal direction and a surface area of the first inner-link end portion are substantially greater than the second inner-link end portion;

wherein the first inner-link opening and the second inner-link opening are circular;

wherein each of the first inner-link opening and the second inner-link opening is configured to receive a single cylindrical link pin;

wherein the extended edge portion comprises a stepped portion in an exteriorly facing surface thereof, a thickness of the stepped portion being smaller than a thickness of another portion of the first inner-link end portion that is adjacent the stepped portion in the longitudinal direction.

16. The inner link plate according to claim 15, wherein the inner link plate is configured to be connected to an outer link plate comprising a first outer-link end portion, a second outer-link end portion and an outer-link intermediate portion interconnecting the first outer-link end portion and the second outer-link end portion; and the extended edge portion has a side surface configured to contact a sprocket tooth of a bicycle sprocket at an area axially adjacent to the outer-link intermediate portion of the outer link plate while the bicycle chain engages with the bicycle sprocket.

17. The inner link plate according to claim 15, wherein the first inner-link end portion, the second inner-link end portion and the first inner-link intermediate portion defines an inner-link outer peripheral edge comprising:

a first inner-link end edge extending about the first inner-link end portion;

a second inner-link end edge extending about the second inner-link end portion; and a pair of first inner-link intermediate edges extending along the first inner-link intermediate portion between the first inner-link end edge and the second inner-link end edge, a first inner-link distance is defined from the first inner-link center axis to an edge of the extended edge portion in the first inner-link end edge;

a second inner-link distance is defined from the first inner-link center axis to the first inner-link end edge in an area except the extended edge portion; and the first inner-link distance is larger than the second inner-link distance.

18. The inner link plate according to claim 15, wherein the extended edge portion is positioned outside a sprocket tooth of a bicycle sprocket in an axial direction with respect to the first inner-link center axis while the bicycle chain is equipped on a bicycle and engages with the sprocket tooth.

19. The inner link plate according to claim 18, wherein the extended edge portion extends from an upstream side toward an outer-link intermediate portion of an outer link plate with respect to a rotational driving direction of the bicycle chain.

* * * * *